United States Patent [19]

Mitsuhashi et al.

[11] Patent Number: 5,714,820
[45] Date of Patent: Feb. 3, 1998

[54] MAGNETIC COUPLING

[75] Inventors: Takashi Mitsuhashi; Sakae Takakusagi, both of Gunma, Japan

[73] Assignee: Ogura Clutch Co., Ltd., Japan

[21] Appl. No.: 708,704

[22] Filed: Sep. 5, 1996

[30] Foreign Application Priority Data

Sep. 8, 1995 [JP] Japan .................. 7-257099

[51] Int. Cl.⁶ .................................................. B67B 3/20
[52] U.S. Cl. ......................... 310/105; 310/92; 310/103; 310/106; 192/84.3; 53/317; 53/331.5
[58] Field of Search ................. 192/84.3; 310/75 D, 310/92, 103, 105, 106; 53/331.5, 317

[56] References Cited

U.S. PATENT DOCUMENTS 4,674,264  6/1987  Ellis et al. ................. 53/331.5

FOREIGN PATENT DOCUMENTS

| 52-119747 | 10/1977 | Japan . |
| 59-156151 | 9/1984 | Japan . |
| 2-72090 | 3/1990 | Japan . |
| 2-294261 | 12/1990 | Japan . |
| 7-111773 | 4/1995 | Japan . |

Primary Examiner—Michael L. Gellner
Assistant Examiner—Raymond Barrera
Attorney, Agent, or Firm—Blakely Sokoloff Taylor & Zafman

[57] ABSTRACT

A magnetic coupling includes a cylindrical housing, a spindle, an adjusting plate, two pairs of permanent magnet discs, two hysteresis material discs, and a screw member. The spindle is rotatably supported at its axial position by the housing. The adjusting plate is rotatably supported by the spindle to partition an interior of the housing into two sections in a direction of the spindle. The two pairs of permanent magnets are provided in the two corresponding sections to respectively oppose each other. One of each pair of permanent magnet discs is fixed in the housing and the other thereof is fixed to the adjusting plate. Each permanent magnet disc has magnetic poles with polarities that alternate in a circumferential direction. The hysteresis material discs are fixed to the spindle and arranged between the corresponding pairs of permanent magnet discs at a predetermined gap. The screw member fixes the adjusting plate to the housing. When the adjusting plate which is released is pivoted, the mutual positional relationships between the respective opposing magnetic poles of the two pairs of permanent magnet discs are adjusted simultaneously.

7 Claims, 8 Drawing Sheets

MAGNETIC COUPLING

BACKGROUND OF THE INVENTION

The present invention relates to a magnetic coupling which is formed by interposing a hysteresis material disc between a pair of permanent magnet discs having a plurality of magnetic poles with alternating polarities in the circumferential direction and opposing each other and which is used in, e.g., a hysteresis clutch and a hysteresis brake.

Conventionally, as a magnetic coupling of this type which uses a pair of permanent magnet discs and a ferromagnetic material (hysteresis material) disc having a large hysteresis loss, one disclosed in Japanese Patent Laid-Open No. 52-119747, U.S. Pat. No. 4,674,264, or the like is known. In the magnetic coupling shown in Japanese Patent Laid-Open No. 52-119747, the spindle is rotatably supported with the first cylindrical yoke having one open end and the second yoke covering the opening portion of the first yoke. A pair of permanent magnet discs serving as driving-side rotors, which are constituted by a plurality of magnetic poles with alternating polarities are disposed in a space defined by the first and second yokes to oppose each other, and a hysteresis material disc serving as a driven-side rotor fixed to the spindle is interposed between the permanent magnet discs. In this magnetic coupling, when the second yoke is pivoted with respect to the first yoke to adjust the positional relationship between the opposing pair of permanent magnet discs, the torque between the first and second yokes and the spindle can be adjusted.

In the conventional magnetic coupling having the above arrangement, the pair of permanent magnet discs are adjusted such that their magnetic poles of the same polarity oppose each other. When the hysteresis material disc is magnetically saturated, the maximum torque can be obtained. In order to further increase the torque, the outer diameters of the permanent magnet discs or hysteresis material disc must be increased, or the number of combinations of the permanent magnet discs and the hysteresis material disc must be increased, as disclosed in Japanese Patent Laid-Open No. 2-72090. More specifically, in the magnetic coupling disclosed in Japanese Patent Laid-Open No. 2-72090, two hysteresis material discs are provided to the spindle to be separated from each other in the axial direction, and two sets of opposing permanent magnet discs are disposed to sandwich the corresponding hysteresis material discs. In this case, torque adjustment is performed by separately adjusting the positional relationship between one pair of permanent magnet discs provided to correspond to one hysteresis material disc and the positional relationship between the other pair of permanent magnet discs provided to correspond to the other hysteresis material disc.

In the magnetic coupling disclosed in Japanese Patent Laid-Open No. 2-72090 described above, however, torque adjustment must be separately performed for each hysteresis material disc, leading to a cumbersome adjusting operation. Since it is difficult to equally adjust the torques of the respective hysteresis material discs, the magnetic coupling may sometimes be undesirably used in an unbalanced state wherein the torque against one hysteresis material disc is large while the torque against the other hysteresis material disc is small, leading to a decrease in allowable work amount.

A magnetic coupling is sometimes used as the torque limiter of a capping machine. In this case, rusting may be caused by water used for cleaning the container, or the water may enter the interior to cause the permanent magnet segment fixed to the yoke to peel.

SUMMARY OF THE INVENTION

It is an object of the present invention to provide a magnetic coupling in which torque adjustment can be performed easily.

It is another object of the present invention to provide a magnetic coupling having excellent corrosion resistance and waterproofness so that peeling of the permanent magnet caused by the rust can be prevented.

In order to achieve the above objects, according to the present invention, there is provided a magnetic coupling comprising a cylindrical housing, a spindle rotatably supported at an axial position thereof by the housing, an adjusting plate rotatably supported by the spindle to partition an interior of the housing into first and second sections in a direction of the spindle, a pair of first permanent magnets provided in the first section to oppose each other, one of the first permanent magnet discs being fixed in the housing and the other thereof being fixed to the adjusting plate, and the first permanent magnet discs having magnetic poles with polarities that alternate in a circumferential direction, a pair of second permanent magnets provided in the second section to oppose each other, one of the second permanent magnet discs being fixed in the housing and the other thereof being fixed to the adjusting plate, and the second permanent magnet discs having magnetic poles with polarities that alternate in the circumferential direction, a first hysteresis material disc fixed to the spindle and arranged between the first permanent magnet discs at a predetermined gap, a second hysteresis material disc fixed to the spindle and arranged between the second permanent magnet discs at a predetermined gap, and a fixing member for fixing the adjusting plate to the housing, wherein, when the adjusting plate which is released is pivoted, a mutual positional relationship between the respective opposing magnetic poles of the first permanent magnet discs and a mutual positional relationship between the respective opposing magnetic poles of the second permanent magnet discs are adjusted simultaneously.

DESCRIPTION OF THE PREFERRED EMBODIMENTS

The present invention will be described in detail by way of the preferred embodiments shown in the accompanying drawings.

A magnetic coupling according to the present invention is an apparatus generally called a hysteresis clutch. This apparatus is used as a torque limiter which is incorporated in a capping machine to cap a cap to the mouth of a container for containing pharmaceutical preparations, cosmetic preparations, and food and to automatically fasten the cap, and which can adjust the fastening torque of the cap.

Figure 1:
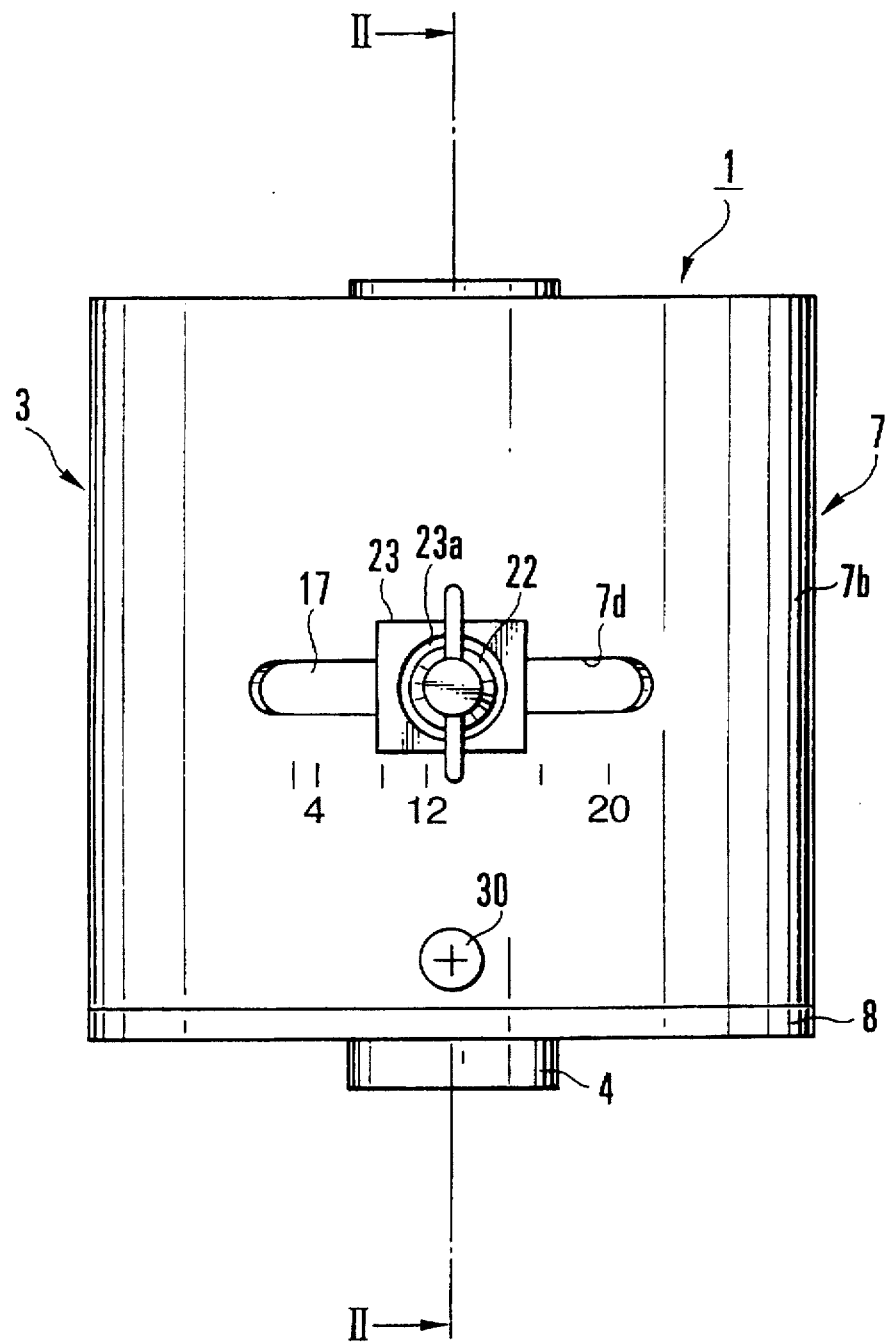
FIG. 1 is a front view showing a magnetic coupling according to the first embodiment of the present invention.
Figure 2:
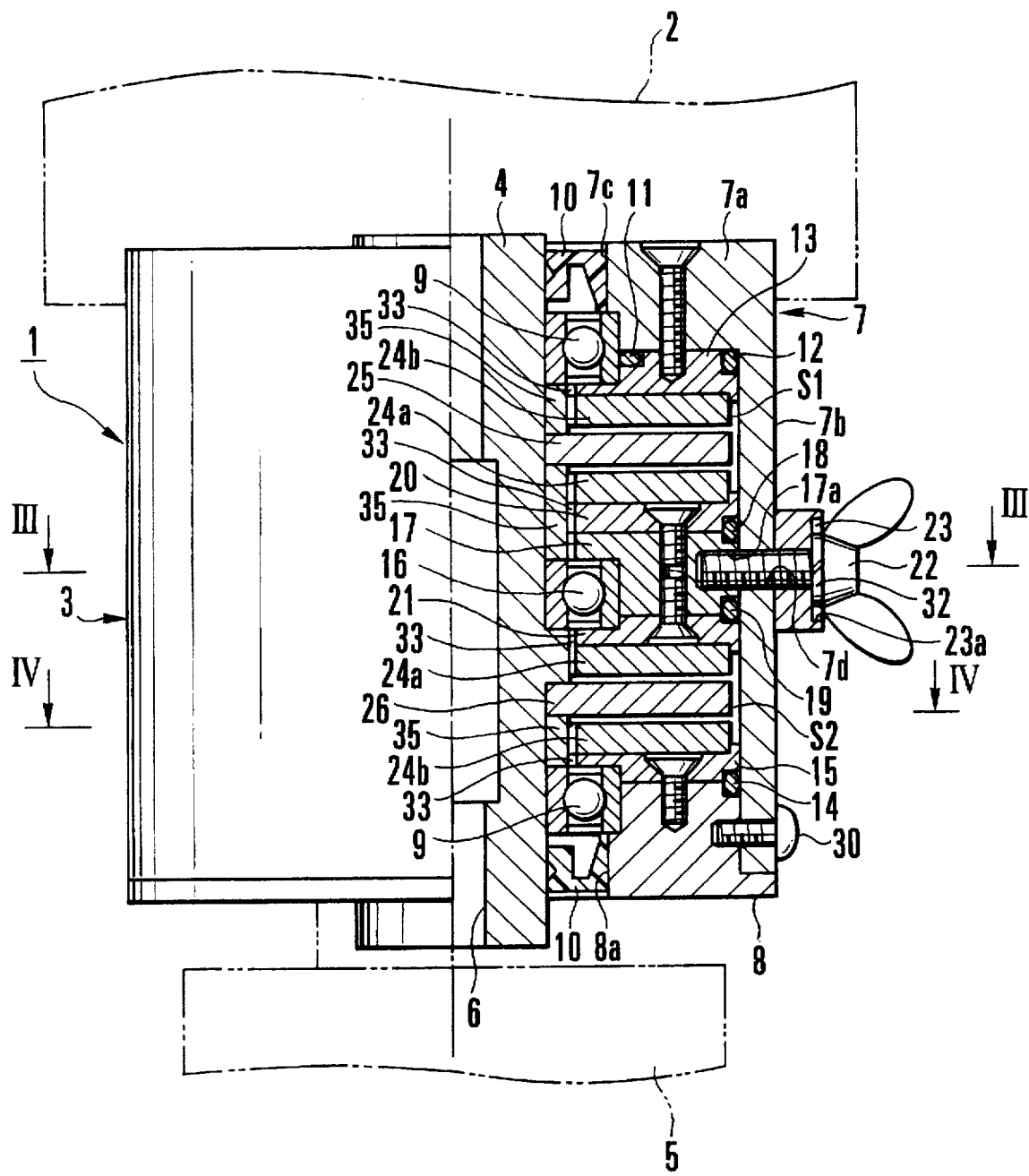
FIG. 2 is a sectional side view taken along the line II—II of the magnetic coupling shown in FIG. 1.

FIGS. 1 to 5 show a magnetic coupling according to the first embodiment of the present invention. Referring to FIG. 2, a magnetic coupling 1 has a nonmagnetic stainless steel housing 3 and a nonmagnetic stainless steel spindle 4. The housing 3 comprises a cylinder fixed to a driving-side member 2 with a screw (not shown). The spindle 4 is supported by the housing 3 to be rotatable in its axial direction. A chuck 5 for holding the cap of a container (not shown) is fixed to the spindle 4 with a screw (not shown). A chuck opening/closing air channel 6 is formed in the center of the spindle 4.

The housing 3 is constituted by a cap-shaped housing body 7 and a side plate 8. One end of the housing body 7 opposing the chuck 5 is open. The side plate 8 is fitted in the opening portion of the housing body 7 through a sealing member 14 and is fixed to it with a set screw 30. The housing body 7 is constituted by a disc portion 7a and a cylindrical portion 7b integrally formed with the disc portion 7a. The disc portion 7a is arranged on the other end side of the side plate 8 to oppose it and constitutes a mounting plate to be mounted on the driving-side member 2. A stepped hole 7c is formed in the center of the disc portion 7a. The spindle 4 is inserted in the stepped hole 7c through a bearing 9 and a sealing member 10 made of, e.g., rubber. A portion of the stepped hole 7c corresponding to the inner side of the housing 3 forms a large-diameter hole portion to fit on the bearing 9. A small-diameter hole portion of the stepped hole 7c corresponding to the outer side of the housing 3 fits on the sealing member 10. Similarly, a stepped hole 8a is formed in the center of the side plate 8. The spindle 4 is inserted in the stepped hole 8a through another bearing 9 and another sealing member 10.

An adjusting plate 17, two pairs of permanent magnet discs 24a and 24b, and two hysteresis material discs 25 and 26 are disposed in the interior of the housing 3 having the above structure. The adjusting plate 17 partitions the interior of the housing 3 in the axial direction into two sections S1 and S2 having identical spaces. The two hysteresis material discs 25 and 26 are interposed between the respective pairs of permanent magnet discs 24a and 24b at a predetermined gap.

Figure 3:
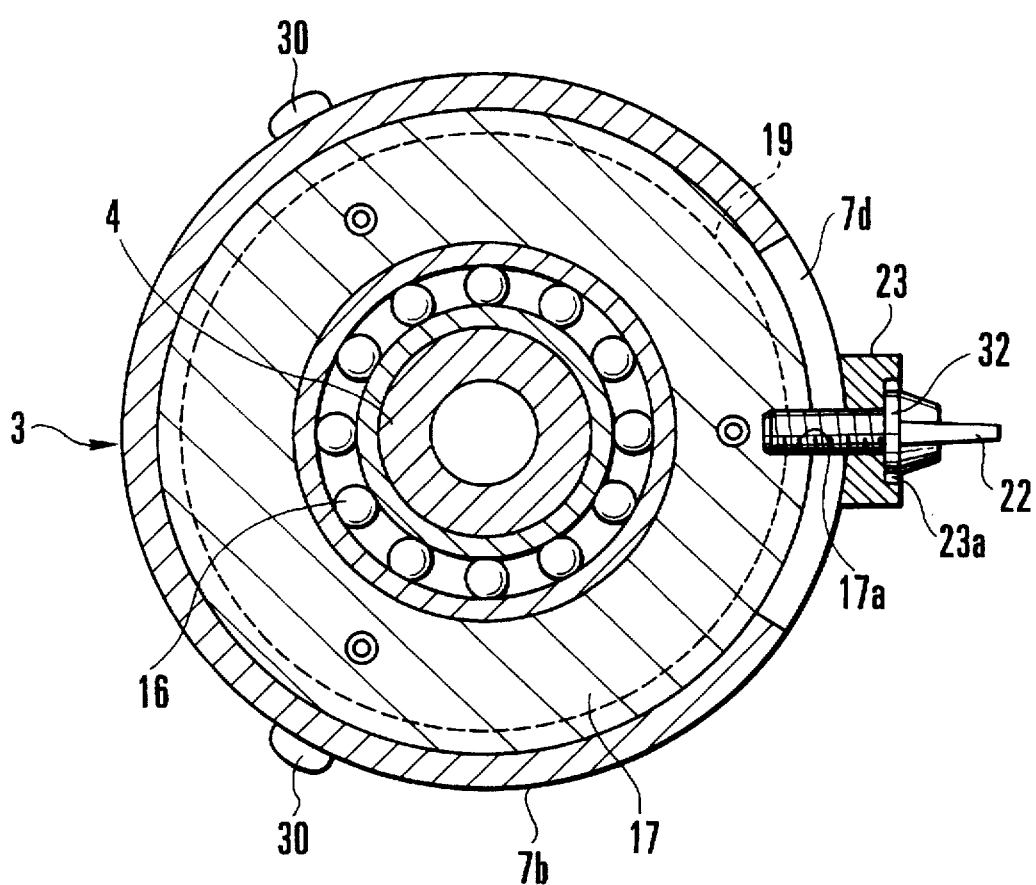
FIG. 3 is a cross-sectional view taken along the line III—III of the magnetic coupling shown in FIG. 2.

The adjusting plate 17 is formed into a circular disc with a nonmagnetic stainless steel material, and axially, rotatably supports substantially the center of the spindle 4 in the axial direction through a bearing 16, as shown in FIG. 3. Two sealing members (O-rings) 18 and 19 are provided on the peripheral edges of the two side surfaces of the adjusting plate 17 to seal the gap between these portions and the inner circumferential surface of the cylindrical portion 7b. A screw hole 17a is formed in the outer circumferential surface of the adjusting plate 17 to be located between the sealing members 18 and 19. A screw member 22 is screwed in the screw hole 17a from the outside of the housing 3. The screw member 22 fixes the adjusting plate 17 to the housing 3 through a spacer 23 and a spring washer 32. As shown in FIG. 1, a slit 7d is formed in the cylindrical portion 7b forming the housing body 7. In torque adjustment, the screw member 22 for pivotally adjusting the adjusting plate 17 released from the housing 3 is inserted in the slit 7d. The slit 7d is formed into a length corresponding to the phase (adjusting width) of, e.g., 360° in the circumferential direction of the cylindrical portion 7b, and has a width smaller than the distance between the two sealing members 18 and 19. The outer circumferential surface of the cylindrical portion 7b near the slit 7d has scale marks to indicate torque adjustment values. A surface of the spacer 23 abutting against the cylindrical portion 7b forms an arcuated surface with a radius of curvature equal to that of the cylindrical portion 7b, so that its entire surface comes into tight contact with the outer circumferential surface of the cylindrical portion 7b. A spot facing portion 23a to fit on the spring washer 32 is formed in the surface of the spacer 23.

Figure 4:
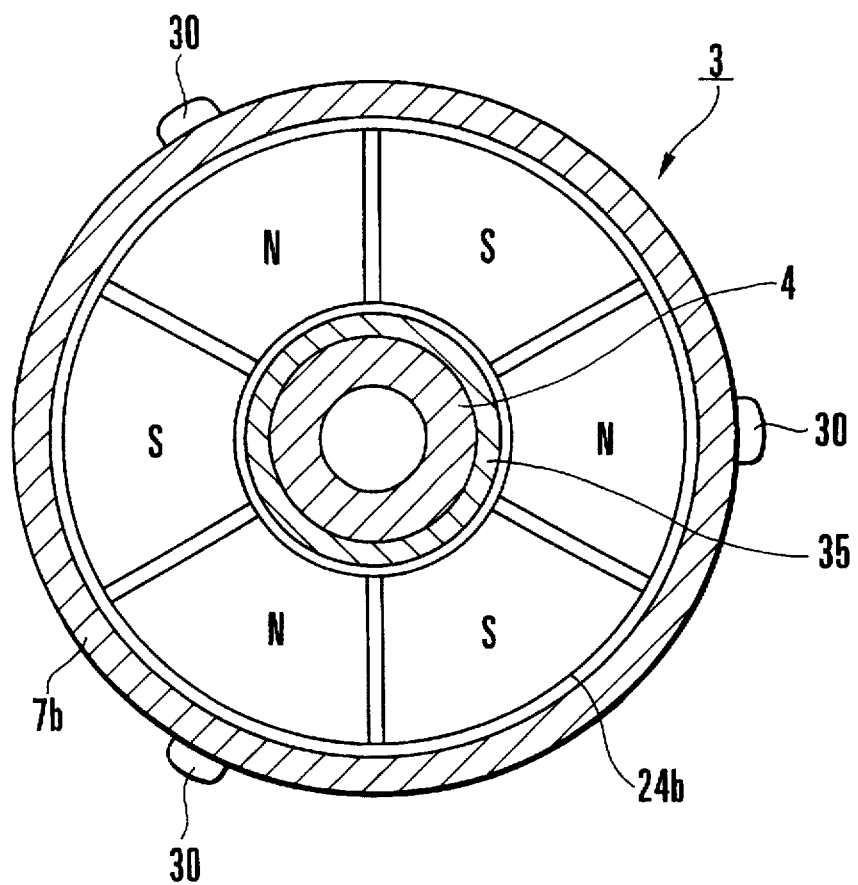
FIG. 4 is a cross-sectional view taken along the line IV—IV of the magnetic coupling shown in FIG. 2.
Figure 5:
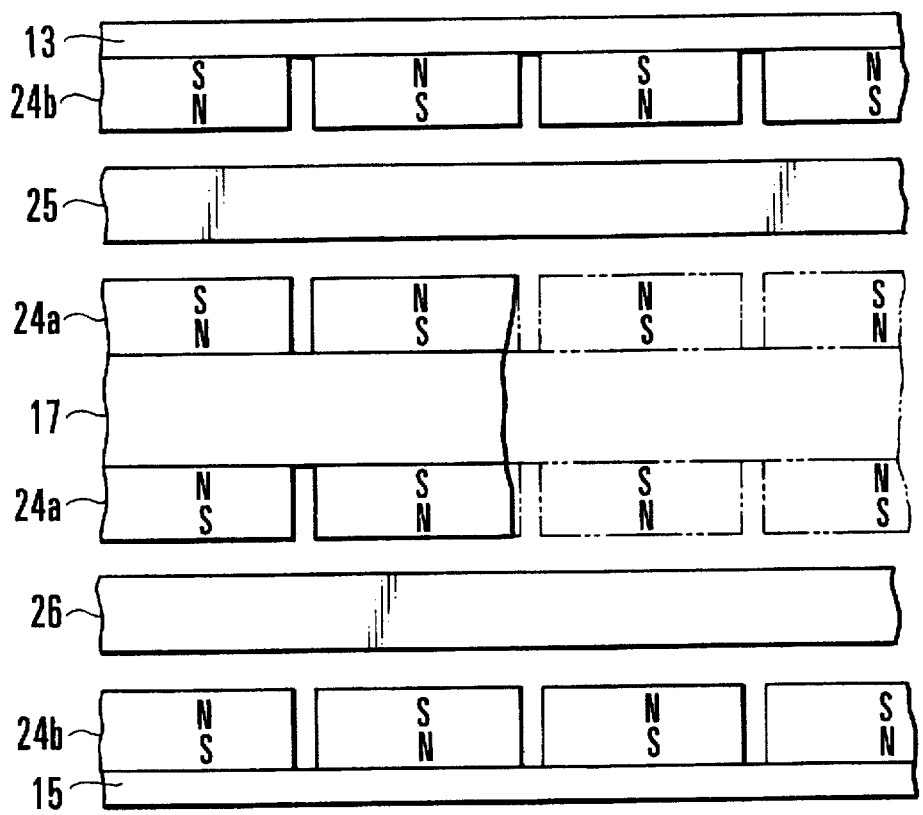
FIG. 5 is a diagram for explaining torque adjustment.

The permanent magnet discs 24a and 24b are obtained by annularly disposing fan-shaped magnet segments having the same size at gaps so that they have the same shape. As shown in FIGS. 4 and 5, the number of magnetic poles of each permanent magnet disc 24a or 24b is six, and N and S magnetic poles are alternately formed in the circumferential direction. As the permanent magnet discs 24a and 24b, for example, plastic magnet or Sm—CO-based rare earth magnet is used.

The pair of permanent magnet discs 24a or 24b arranged in the section S1 or S2 oppose through a predetermined gap. In the section S1, the permanent magnet disc 24a is fixed to a yoke 20, fixed to one side surface of the adjusting plate 17 through the sealing member 18, with an adhesive, and the permanent magnet disc 24b is fixed to a yoke 13, fixed to the inner side surface of the disc portion 7a through sealing members 11 and 12 in the same manner. In the section S2, the permanent magnet disc 24a is fixed to a yoke 21, fixed to the other side surface of the adjusting plate 17 through the sealing member 19, and the permanent magnet disc 24b is fixed to a yoke 15, fixed to the inner surface of the side plate 8 through a sealing member 14. The permanent magnet disc 24a of the section S1 and the permanent magnet disc 24a of the section S2 are set to have such a positional relationship that their magnetic poles of the same polarity oppose each other, and the permanent magnet disc 24b of the section S1 and the permanent magnet 24b of the section S1 are set to have such a positional relationship that their magnetic poles of the same polarity oppose each other. The yokes 13, 15, 20, and 21 are formed into discs larger than the permanent magnet discs 24a and 24b, and respectively have central holes 33 at their centers through which the spindle 4 is inserted. Central holes through which the spindle 4 is inserted are formed also in the permanent magnet discs 24a and 24b, respectively.

The two hysteresis material discs 25 and 26 interposed between the corresponding pairs of permanent magnet discs 24a and 24b are fitted in and fixed on the spindle 4, and their movement in the axial direction is regulated by spacers 35. Hence, all the gaps between the hysteresis material discs 25 and 26 and the permanent magnet discs 24a and 24b are set equally.

In the magnetic coupling 1 having the above structure, when the housing 3 and the adjusting plate 17 are rotated together with the driving-side member 2, the hysteresis material discs 25 and 26 are magnetized by the rotating magnetic fields generated by the two sets of permanent magnet discs 24a and 24b, and the torque is transmitted to the hysteresis material discs 25 and 26 by the magnetic interaction between one pair of permanent magnet discs 24a and 24b with the hysteresis material disc 25 and the other pair of permanent magnet discs 24a and 24b with the hysteresis material disc 26. Upon rotation of the hysteresis material discs 25 and 26, the spindle 4 and the chuck 5 mounted on it are also rotated integrally. Thus, a cap (not shown) held by the chuck 5 is capped to the mouth of the container and fastened. When the cap is completely fastened, the spindle 4 is stopped by the fastening torque.

In this case, when the pair of permanent magnet discs 24a and 24b opposing each other through the hysteresis material disc 25 (26) are arranged such that their magnetic poles of the same polarity oppose each other, the magnetic flux from the permanent magnet discs 24a and 24b forcibly passes through the hysteresis material disc 25 (26) due to the reaction between the respective opposing magnetic poles. Therefore, even if each of the hysteresis material disc 25 and 26 has a large thickness (to have a large effective sectional area), the loop area of the hysteresis material can be increased without decreasing the magnetic flux density, while increasing its volume. As a result, due to their synergistic effect, the magnetic efficiency is improved, so that the transmission torque can be increased without increasing the outer diameters of the hysteresis material discs 25 and 26.

Torque adjustment for adjusting the fastening torque of the cap is performed by the screw member 22. First, the screw member 22 fastened in the housing 7 is loosened to release the fixed adjusting plate 17. Subsequently, the screw member 22 in the loose state is moved manually along the slit 7d. As the screw member 22 serving as the operational member moves, the adjusting plate 17 also pivots in the circumferential direction, and the two permanent magnet discs 24a and 24b fixed to the adjusting plate 17 also pivot together with the adjusting plate 17. After pivotal adjustment, the screw member 22 is fastened through the slit 7d to fix the adjusting plate 17 on the housing body 7. Hence, the positional relationship between the magnetic poles of the two sets of permanent magnet discs 24a and 24b arranged in the respective sections S1 and S2 to oppose each other can be adjusted simultaneously. Accordingly, the torques of the sections S1 and S2 with respect to the pivot amount of the adjusting plate 17 increase or decrease at the equal rates.

To maximize the fastening torque, the pair of permanent magnet discs 24a and 24b may be set to oppose each other such that their magnetic poles of the same polarities coincide with each other, as indicated by alternate long and two short dashed lines in FIG. 5. To reduce the fastening torque, the opposing areas of the magnetic poles of the same polarities opposing each other are gradually decreased so that the opposing areas of the magnetic poles of the opposite polarities are increased. When the magnetic poles of the opposite polarities are set to completely coincide with each other, as indicated by solid lines in FIG. 5, the torque can be minimized. The fastening torque is designed to fall within a range of about 4 kgfcm to 25 kgfcm.

Figure 6:
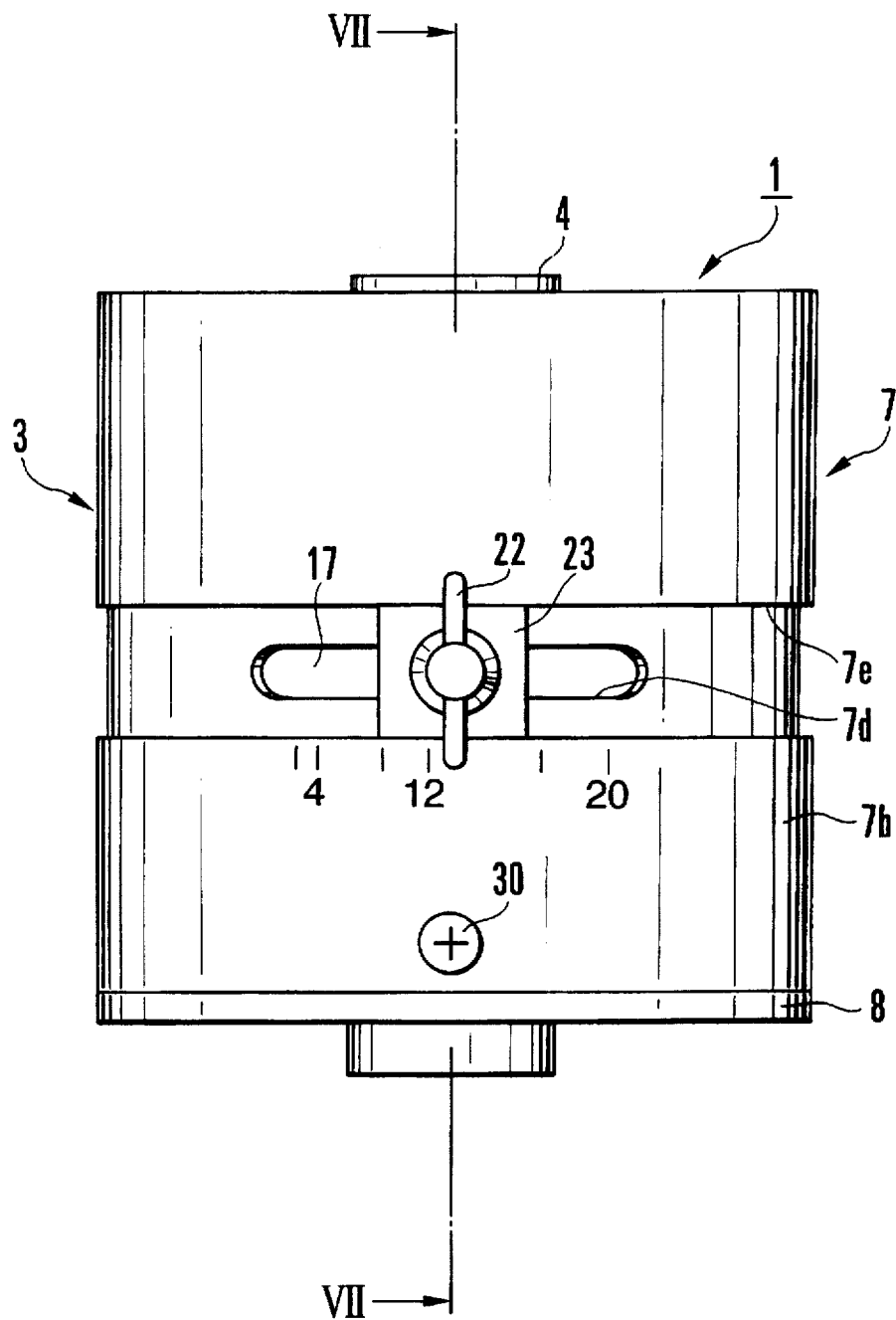
FIG. 6 is a front view showing a magnetic coupling according to the second embodiment of the present invention.
Figure 7:
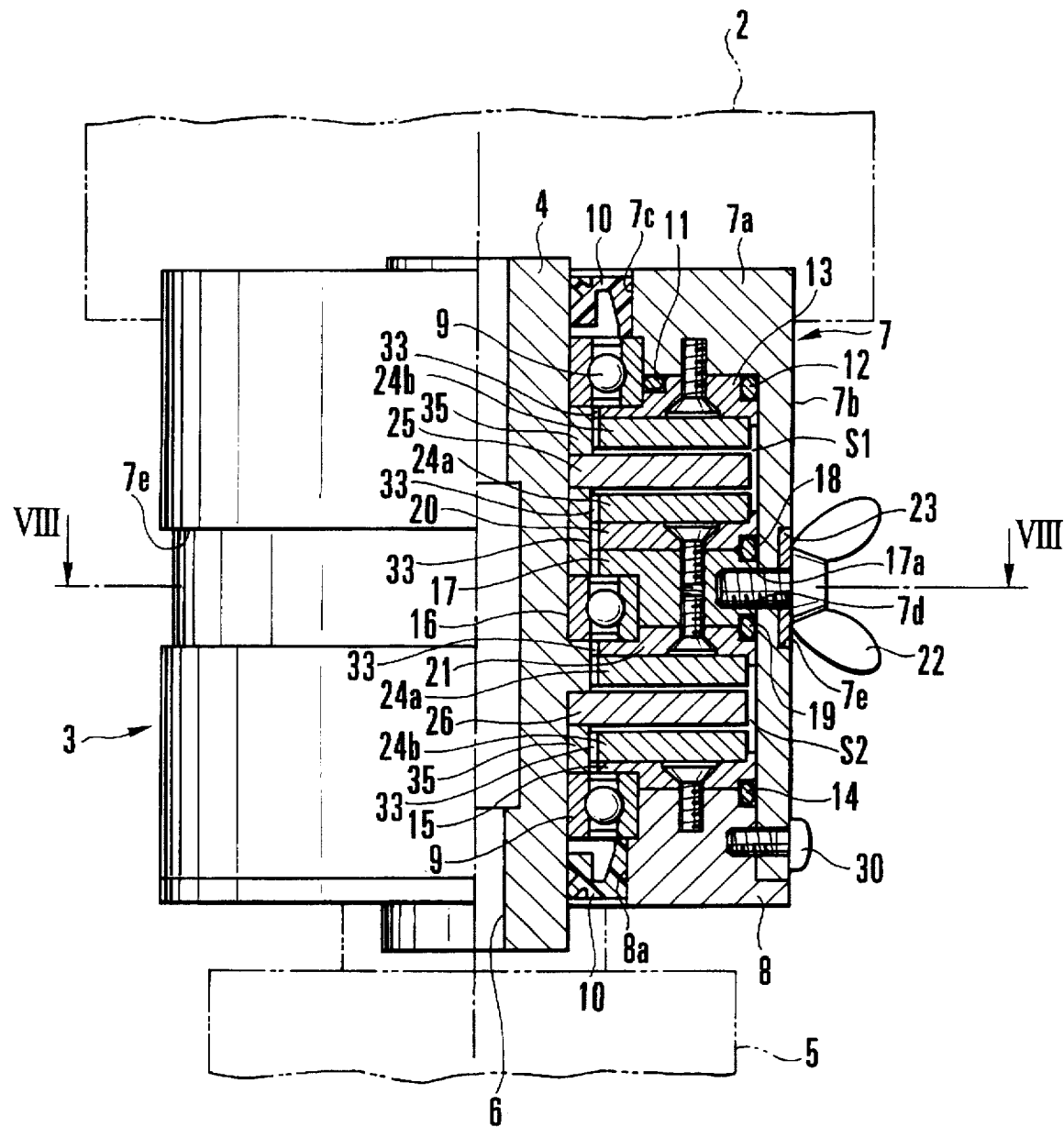
FIG. 7 is a partially cutaway side view taken along the line VII—VII of the magnetic coupling shown in FIG. 6.
Figure 8:
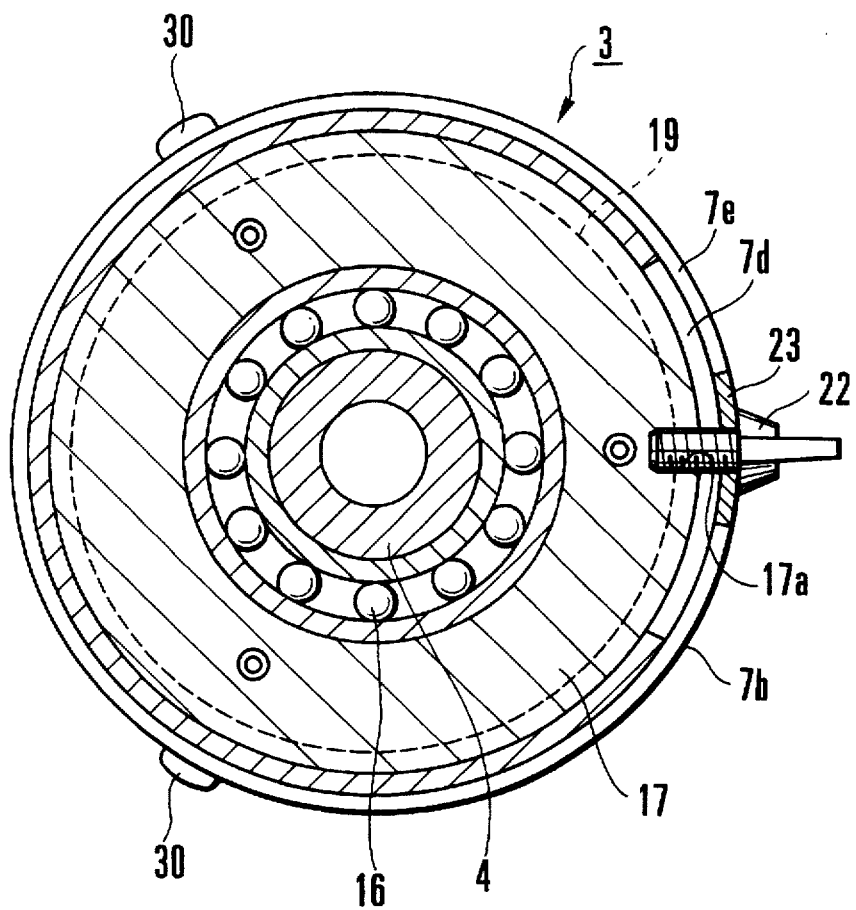
FIG. 8 is a cross-sectional view taken along the line VIII—VIII of the magnetic coupling shown in FIG. 7.

FIGS. 6 to 8 show the second embodiment of the present invention. In the second embodiment, as shown in FIGS. 6 and 7, an annular groove 7e is formed, along a slit 7d, in the outer circumferential surface of a cylindrical portion 7b constituting a housing body 7 to have a width larger than that of the slit 7d. A square spacer 23 is slidably disposed in the annular groove 7e, and a screw member 22 is inserted in an insertion hole formed in the spacer 23 and is screwed into a screw hole in the adjusting plate 17. As shown in FIG. 8, the spacer 23 is formed of a metal plate or the like having spring properties to have an arcuated shape having a radius of curvature smaller than that of the bottom surface of the annular groove 7e. As the spacer 23 is pressed against the bottom surface of the annular groove 7e with the screw member 22, the screw member 22 is prevented from being loosened. Since the spacer 23 is formed into a rectangular shape having a width slightly smaller than the groove width of the annular groove 7e, it is engaged in the annular groove 7e to be slidable and nonrotatable. Since other arrangements are the same as in the first embodiment, the identical members and the like are denoted by the same reference numerals, and a detailed description thereof is omitted.

In this structure, when the screw member 22 is fastened or loosened, the spacer 23 engages in the annular groove 7e and does not rotate. Thus, the fastening torque can be adjusted easily. Since the spacer 23 has a function of preventing loosening of the screw member 22, a spring washer like the spring washer 32 shown in FIG. 2 is not required.

As has been described above, in the magnetic coupling according to the present invention, torque adjustment of the two sets of permanent magnet disc pairs can be performed at once, resulting in easy adjustment. The transmission amount of torque from the two sets of permanent magnet disc pairs to the two hysteresis material discs can be increased or decreased always at the same rate.

Since water is reliably prevented from entering the housing, rusting and peeling of the permanent magnets from the yokes due to the rust can be prevented, thereby maintaining stable torque transmission.

Since the corrosion resistance of the magnetic coupling can be improved, the good outer appearance of the magnetic coupling can be maintained, and the magnetic coupling can be mounted even on an apparatus that requires strict sanitary management.

When the screw member is fastened or loosened, the spacer does not rotate, so that the fastening torque can be adjusted easily. As the spacer has the function of preventing the screw member from loosening, no spring washer is required.

What is claimed is:

1. A magnetic coupling comprising:
   a cylindrical housing comprising a cap-shaped housing body having an opening portion at one end thereof and a side plate fixed to said opening portion of said housing body through a sealing member,
   a spindle rotatably supported at an axial position thereof by said housing,
   an adjusting plate rotatably supported by said spindle through a bearing and fitted in said housing through sealing members to partition an interior of said housing into first and second sections in a direction of said spindle,
   a pair of first permanent magnet discs provided in said first section to oppose each other, one of said first permanent magnet discs being fixed in said housing and the other thereof being fixed to said adjusting plate, and said first permanent magnet discs having magnetic poles with polarities that alternate in a circumferential direction,
   a pair of second permanent magnet discs provided in said second section to oppose each other, one of the said second permanent magnet discs being fixed in said housing and the other thereof being fixed to said adjusting plate, and said second magnet discs having magnetic poles with polarities that alternate in the circumferential direction, wherein one of said first permanent magnet discs and one of said second permanent magnet discs have the same phase relationship, and the other of said first permanent magnet discs and the other of said second permanent magnet discs have the same phase relationship,
   a first hysteresis material disc fixed to said spindle and arranged between said first permanent magnet discs at a predetermined gap,
   a second hysteresis material disc fixed to said spindle and arranged between said second permanent magnet discs at a predetermined gap, a slit formed in said housing in the circumferential direction to enable said adjusting plate to be pivotally adjusted from an outside of said housing, and a screw member for threadably engaging with an outer circumferential surface of said adjusting plate through the slit, thereby fastening and fixing said adjusting plate to said housing, wherein, when said adjusting plate which is released is pivoted by operating said screw member projecting from the slit to the outside of said housing, a mutual positional relationship between said respective opposing magnetic poles of said first permanent magnet discs and a mutual positional relationship between said respective opposing magnetic poles of said second permanent magnet discs are adjusted simultaneously.

2. A coupling according to claim 1, wherein said housing, said adjusting plate, and said spindle are made of a non-magnetic stainless steel material.

3. A coupling according to claim 1, further comprising an annular groove formed in an outer circumferential surface of said housing along the slit to have a width larger than that of the slit, and a slidable, nonrotatable spacer having an insertion hole for said screw member and engageable with the annular groove, and wherein said screw member is fastened on said outer circumferential surface of said adjusting plate through said spacer and the slit.

4. A coupling according to claim 3, wherein said spacer is made of an arcuated metal piece having spring properties and a radius of curvature smaller than that of said outer circumferential surface of the annular groove.

5. A coupling according to claim 1, wherein one of said first permanent magnet discs and one of said second permanent magnet discs are fixed on inner walls of respective end faces of said housing through first yokes, and the other of said first permanent magnet discs and the other of said second permanent magnet discs are fixed on respective side surfaces of said adjusting plate through second yokes.

6. A coupling according to claim 5, wherein said sealing members are adapted to prevent water from entering said housing through said slit.

7. A coupling according to claim 6, wherein said sealing members comprises a pair of O-rings provided between peripheral edges of two surfaces of said adjusting plate and an inner circumferential surface of said housing, said slit being arranged between said O-rings.

\* \* \* \* \*